US012744732B2

(12) United States Patent
Choi et al.

(10) Patent No.: US 12,744,732 B2
(45) Date of Patent: Sep. 22, 2026

(54) DEVICE AND METHOD FOR ROUTING SERIAL TRAFFIC OF A BUILDING MANAGEMENT SYSTEM

(71) Applicant: Siemens Industry, Inc., Alpharetta, GA (US)

(72) Inventors: William Choi, Lake Zurich, IL (US); Zackarey Bearss, Chicago, IL (US); Anthony J. Bednaroski, Windsor, CO (US); Thomas Evans, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 49 days.

(21) Appl. No.: 18/978,705

(22) Filed: Dec. 12, 2024

(65) Prior Publication Data

US 2026/0172345 A1 Jun. 18, 2026

(51) Int. Cl.
*H04L 45/50* (2022.01)

(52) U.S. Cl.
CPC .................................. *H04L 45/502* (2013.01)

(58) Field of Classification Search
CPC ............... H04L 45/502; H04L 12/2816; H04L 12/2803; H04L 67/12
USPC .......................................................... 709/238
See application file for complete search history.

(56) References Cited

U.S. PATENT DOCUMENTS 7,835,372 B2 * 11/2010 Wang .................... H04L 12/462 370/401
2006/0274745 A1 * 12/2006 Wang .................... H04W 88/16 370/389
2009/0006611 A1 * 1/2009 Hong .................... H04L 43/028 709/224
2009/0287736 A1 * 11/2009 Shike .................... H04L 12/417 709/224
2010/0128708 A1 5/2010 Liu et al.
2015/0160628 A1 * 6/2015 Kalafut ............... H04L 12/2803 700/275
2016/0234186 A1 * 8/2016 Leblond .................. H04L 63/08
2018/0234266 A1 8/2018 Rudolph et al.
(Continued)

OTHER PUBLICATIONS

Agne Srebaliute, "IPv4 Packet Header: Format and Structure", Aug. 2, 2022, IPXO, https://www.ipxo.com/blog/ipv4-packet-header/ (Year: 2022).*

(Continued)

*Primary Examiner* — Ruolei Zong

(57) ABSTRACT

A building controller and a method thereof routes serial traffic in a building management system. Non-IP serial traffic is read from a non-IP network of building devices managed by the building controller and forwarded to a building network stack operating on the building controller. The building controller performs building controller operations based on data stored at the building network stack. The non-IP serial traffic is also mirrored to a frame router operating on the building controller in response to detecting that remote traffic monitoring has been enabled. The frame router identifies a destination interface of the building controller to route the non-IP serial traffic and generates a data packet that includes the non-IP serial traffic and an IP header. The data packet is provided to an IP network of building management devices connected to the building controller, including a remote device which has a serial traffic analyzer.

18 Claims, 4 Drawing Sheets

(56) References Cited

U.S. PATENT DOCUMENTS

| | | | | |
|---|---|---|---|---|
| 2018/0309818 | A1 * | 10/2018 | Park | H04L 67/34 |
| 2019/0260781 | A1 | 8/2019 | Fellows et al. | |
| 2019/0310836 | A1 * | 10/2019 | Reichl | G06F 8/61 |
| 2021/0389742 | A1 * | 12/2021 | Deshpande | G05B 15/02 |
| 2024/0036537 | A1 * | 2/2024 | Gupta | H04L 12/2834 |

OTHER PUBLICATIONS

Desigo Modular Automation Station, PXC7.E400.A Data Sheet downloaded from https://www.siemens.com/us/en/products/buildingtechnologies/automation/controllers-extension-i-o/desigo-pxc.html on Dec. 2, 2024,19 pages.

* cited by examiner

DEVICE AND METHOD FOR ROUTING SERIAL TRAFFIC OF A BUILDING MANAGEMENT SYSTEM

TECHNICAL FIELD

This application relates to the field of building management systems and, more particularly, to a system for routing serial traffic from field level devices upstream to management level devices.

BACKGROUND

Building management systems encompass a wide variety of systems that aid in the monitoring and control of various aspects of building operation. Building management systems include security systems, fire safety systems, lighting systems, and heating, ventilation, and air conditioning ("HVAC") systems. A single system may include multiple subsystems that are controlled by a common workstation.

Many jobsites have building management systems that utilize older network communication technologies like MSTP, Modbus, or a proprietary communication protocol. These systems require site visits by a technician on-premises to hardwire into the network and assess problems and conditions. Specifically, physical intervention is usually necessary due to the difficulty of monitoring the serial network traffic. For example, a technician may visit a jobsite and physically attach a laptop having a serial sniffer tool to the network and monitor the serial traffic to diagnose any issues. Although a computing device may be attached to the monitored device and maintained at the jobsite, such a configuration is costly and inconvenient.

SUMMARY

In accordance with one embodiment of the disclosure, there is provided a remote monitoring approach for building management systems. Network traffic of local devices may be routed via network connectivity to a network protocol analyzer tool at a remote location. A user of the remote tool may request a log of all local network traffic, and duplicate information about the network traffic may be re-routed through the network to the remote tool.

One aspect is a building controller for routing serial traffic to a remote device of a building management system. The building controller comprises a first interface, a building network stack, a frame router, and a second interface. The first interface reads non-IP serial traffic from a non-IP network of building devices managed by the building controller. The building network stack operates on the building controller to forward the non-IP serial traffic. The building controller performs building controller operations based on data stored at the building network stack. The frame router operates on the building controller to forward the non-IP serial traffic to a frame router in response to detecting that remote traffic monitoring has been enabled. The frame router identifies a destination interface of the building controller to route the non-IP serial traffic. The frame router generates a data packet that includes the non-IP serial traffic and an IP header. The second interface provides the data packet to an IP network of building management devices connected to the building controller. The building management devices include the remote device of the building management system connected to the IP network. The remote device has a serial traffic analyzer operating at the remote device.

Another aspect is a method of a building controller for routing serial traffic to a remote device of a building management system. Non-IP serial traffic is read from a non-IP network of building devices managed by the building controller. The non-IP serial traffic is forwarded to a building network stack operating on the building controller. The building controller performs building controller operations based on data stored at the building network stack. The non-IP serial traffic is forwarded or mirrored to a frame router operating on the building controller in response to detecting that remote traffic monitoring has been enabled. A destination interface of the building controller is identified by the frame router to route the non-IP serial traffic. A data packet is generated by the frame router in which the data packet includes the non-IP serial traffic and an IP header. The data packet is provided to an IP network of building management devices connected to the building controller. The building management devices include the remote device of the building management system connected to the IP network. The remote device has a serial traffic analyzer operating at the remote device.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
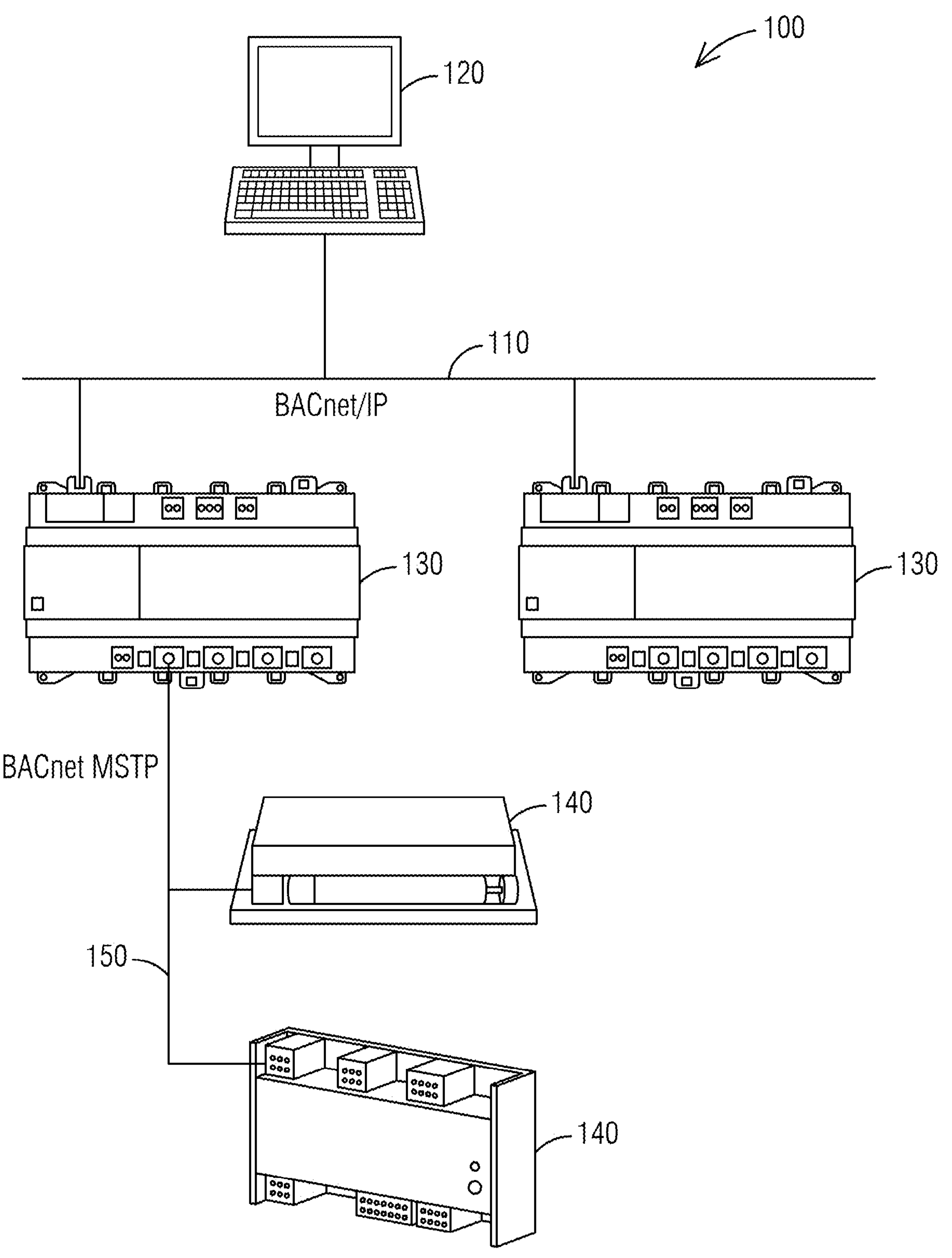
FIG. 1 is an illustration of an environment in an example implementation that is operable to employ techniques described herein.

Various technologies that pertain to systems and methods that facilitate remote serial traffic monitoring will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The building controller includes circuitry to allow serial traffic to be piped to a TCP or IP port of the controller so that someone could remotely use a network traffic analyzing tool to connect to the port. The building controller may monitor the traffic without the need to be present at the device's location or otherwise need to physically change the network. By utilizing the building controller to monitor the serial traffic, the building management system may diagnose and resolve issues quickly and efficiently based on network traffic data. This feature of the building controller may be enabled, disabled, configured to use a specific port or expect a certain IP address, configured to monitor a specific COM port of the device, see the status of which COM ports are being monitored at which ports, or permanently disabled for jobsites that have no interest in having the feature.

Referring to FIG. 1, there is shown an environment in an example implementation that is operable to employ techniques described herein. The system 100 performs remote monitoring by routing network traffic of site local devices to a network protocol analyzer tool at a remote location. The remote location is considered to be remote from a user convenient communication distance from the building controller such as beyond physical proximity for a wired connection or beyond any adjacent proximity for a wireless connection. For example, the remote location may be remote from the area (such as room, floor, building, or campus) of the building controller. The system 100 may comprise one or more management level networks 110, such as a network backbone or core network, for connectivity to components of a management device 120 and associated building controllers 130. Specifically, the management level network 110 may be a local area network for interconnecting control and monitoring devices, including the building controllers 130, for communication with the management device 120. The building controllers 130 are automation level devices communicating between management level devices and room level devices. In particular, the building controllers 130 are building automation controllers capable of being programmed for HVAC, lighting, security, fire safety, and other building systems to manage multiple building devices 140 of a facility or multiple facilities.

The example system 100 may comprise one or more management devices 120, such as a management workstation, server, or remote device, connecting through the management level network 110, and allows the setting and/or changing of various controls of the system 100. The management devices 120 connect to the management level network 110 for communication with the building controllers 130 and building devices 140 via the building controllers. While a brief description of the system 100 is provided below, it will be understood that the system 100 described herein is only one example of a particular form or configuration for a building management system. The system 100 may be implemented in any other suitable manner without departing from the scope of this disclosure. The management devices are configured to provide overall control and monitoring of a building device 140, a group of building devices, or the system 100.

For the illustrated embodiment of FIG. 1, the building management system 100 provides connectivity based on one or more communication protocols to subsystems for various facility parameters. For each subsystem, one or more building controllers 130 may be coupled to various building devices 140, such field controllers and field devices, via a non-IP network 150 for monitoring and/or controlling areas within a building or group of buildings. In this manners, the building controller 130 provides communications between networks utilizing different protocols, such as non-IP networks 150 and IP networks 110. An example a non-IP network 150 includes a master-slave/token-passing ("MSTP") network for building automation systems that allow building devices 140 to communicate with each other. An example of an IP network 110 includes a transmission control protocol ("TCP") network that allows data packets to be sent a received in the correct order with minimal errors. Examples of field controllers include, but are not limited to, variable air volume controllers, variable frequency drive controllers, direct digital controllers, BACnet controllers, chiller controllers, and the like. Examples of field devices include, but are not limited to, room sensors or monitors, variable air volume boxes, variable frequency drives, liquid or gas control valves, damper actuators, air handling unit controls, fan coil unit controls, chillers, boilers, and the like.

The illustration of the system 100 in FIG. 1 is not meant to imply physical or architectural limitations to the manner in which different illustrative embodiments may be implemented. For example, the system 100 may communicate signals over different types of network topologies, such as a linear (bus) topology, a ring topology, or a star topology. Also, other components in addition to and/or in place of the ones illustrated may be used, and some components may be unnecessary in some illustrative embodiments.

Figure 2:
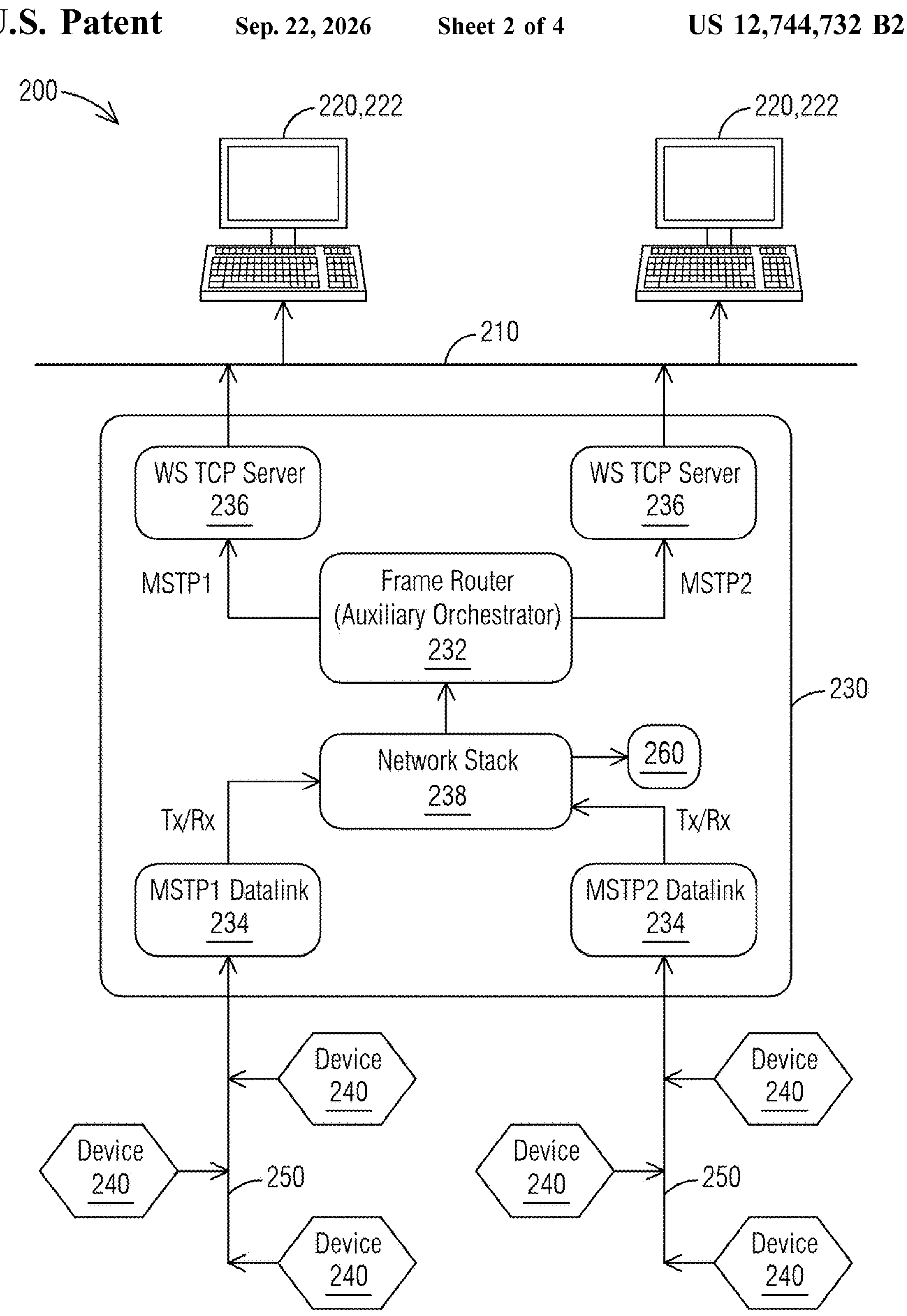
FIG. 2 is a diagram of the environment of FIG. 1 in which the modules and operation of the building controller are illustrated.

Referring to FIG. 2, there is shown the system 100, 200 of FIG. 1 in which the modules and operation of the building controller 130, 230 are illustrated. The building management system 200 comprises a building controller 230 communicating with one or more management devices 220 via an IP network 210 (management level) and one or more building devices 240 (room level) via a non-IP network 250. As stated above, the building controllers 230 are building automation controllers capable of being programmed for HVAC, lighting, security, fire safety, and other building systems to manage multiple building devices 140 of a facility or multiple facilities.

The building controller 230 includes a frame router, one or more first interfaces 234, and one or more second interfaces 236. Each first interface 234 includes a non-IP datalink and a physical non-IP port, and each second interface 236 includes an IP server and a physical IP port. For some embodiments, each non-IP datalink 234 is a MSTP Datalink and each IP server 236 is a transmission control protocol server, such as a TCP server. The first interface 234 reads non-IP traffic from the non-IP network 250 of building devices 240 managed by the building controller 230.

The building controller also includes a building network stack 238 operating on the building controller 230. The non-IP serial traffic read by the first interface 234 is forwarded to the building network stack 238. The building network stack 238 facilitates communications among components of the building controller 230. The building controller 230 performs building controller operations based on data store at the building network stack 238, i.e., the main application of the building controller 230 for normal processing of controller functions. In particular, the building network stack 238 allows for the non-IP serial traffic, or a duplicate of the serial traffic, to be provided to one or more controller components 260 as well as to the frame router 232.

The frame router 232 performs other operations based on the data store at the building network stack 238, i.e., an auxiliary operation of the building controller 230 for analyzing serial traffic. The frame router 232 operates on the building controller 230 to receive the non-IP serial traffic in response to detecting that remote traffic monitoring has been enabled. The frame router 232 also identifies a destination interface of the building controller to route the non-IP serial traffic and generates a data packet that includes the non-IP serial traffic and an IP header.

The second interface 236 provides the data packet to the IP network 210 of building management devices 220 connected to the building controller 230. The building management devices 220 include a remote device 222 of the building management system connected to the IP network 210 in which the remote device has and operates a serial traffic analyzer.

Figure 3:
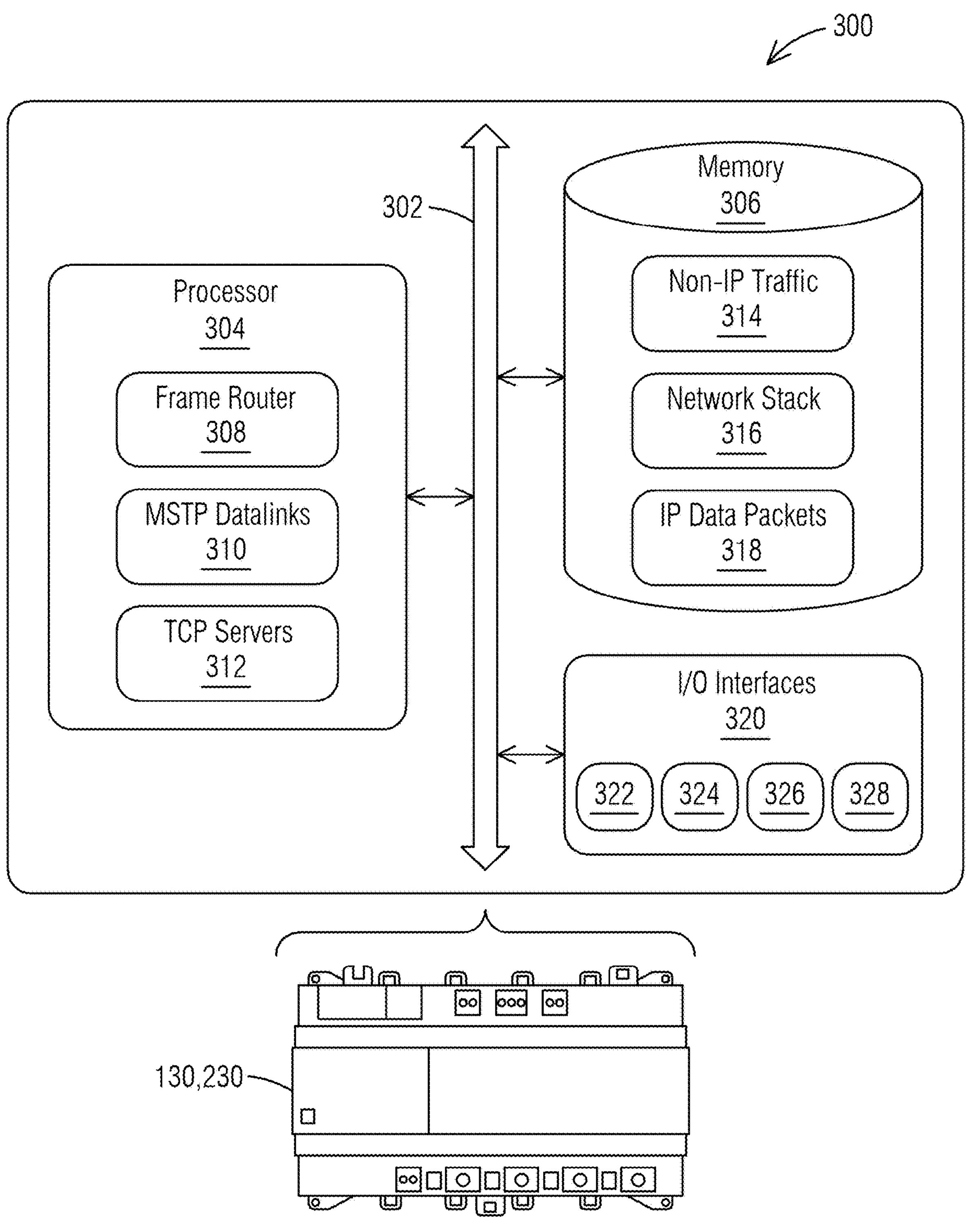
FIG. 3 is a block diagram of internal components of the building controller of FIGS. 1 and 2 in an example implementation.

FIG. 3 represents example device components 300 of a building controller 130, 230 of the building management system 100. The device components 300 comprise a communication bus 302 for interconnecting other device components directly or indirectly. The other device components include one or more processors 304 and one or more memory components 306.

The processor or processors 304 may execute code and process data received from other components of the device components 300, such as information stored at the memory component 306. The code associated with the system 100 and stored by the memory component 306 may include, but is not limited to, operating systems, applications, software modules, drivers, and the like. An operating system includes executable code that controls basic functions, such as interactions among the various components of the device components 300, communication with external devices, and storage and retrieval of code and data to and from the memory component 306.

Each application includes executable code to provide specific functionality for the processor 304 and/or remaining components of the building controller 130, 230. Examples of applications executable by the processor 304 include, but are not limited to, a frame router module 308, a first interface module 310, and a TCP server module 312. The frame router module 308 implements the frame router 232 that receives the non-IP serial traffic, identifies the destination interface of the building controller to route the non-IP serial traffic, and generates the data packet the first interface 234. The first interface module 310 implements the first interface 234, such as a MSTP Datalink communicating with a non-IP port, to read the non-IP serial traffic from the non-IP network 250. The second interface module 312 implements the second interface 236, such as a TCP server communicating with an IP port, to provide the data packet to the IP network 210.

Data stored at the memory component 306 are information that may be referenced and/or manipulated by an operating system or application for performing functions of the building controller 130, 230. Examples of data associated with the system 100 and stored by the memory component 306 may include, but are not limited to, non-IP traffic data 314, building network stack data 316, and IP data packet data 318. The non-IP traffic data 314 includes serial traffic of building devices based on a serial protocol such as, but not limited to, MSTP. The building network stack data 316 includes information received and processed by the building network stack 238 of the building controller 230, such as the non-IP serial traffic. The IP data packet data 318 includes data packets based on an IP network protocol that includes the non-IP serial traffic as well as one or more IP headers to guide the non-IP serial traffic to the serial traffic analyzer of the remote device.

I/O interfaces 320 of the device components 300 may include one or more input and/or output components 322-328. Components of the VO interfaces 320 of the device components 300 may include one or more ports, drivers, and other components. Examples of components 322, 324, 326 include, but are not limited to, a non-IP port corresponding to the first interface 234 and the first interface module 310 of the building controller 130, 230, and an IP port corresponding to the second interface 236 and the second interface module 312 of the building controller.

The I/O interfaces 320 may include a user interface 328 for visual, audio, and/or mechanical interaction with a user of the device. The user interface 222 may include a combination of hardware and software to provide a user with a desired user experience. The user interface 328 of the building controller may provide a signal to the frame router 232 associated with enablement of the remote traffic monitoring.

It is to be understood that FIG. 3 is provided for illustrative purposes only to represent examples of the device components 300 of the building controller 130, 230 and is not intended to be a complete diagram of the various components that may be utilized by the system. Therefore, the building controller 130, 230 may include various other components not shown in FIG. 3, may include a combination of two or more components, or a division of a particular component into two or more separate components, and still be within the scope of the present invention.

Figure 4:
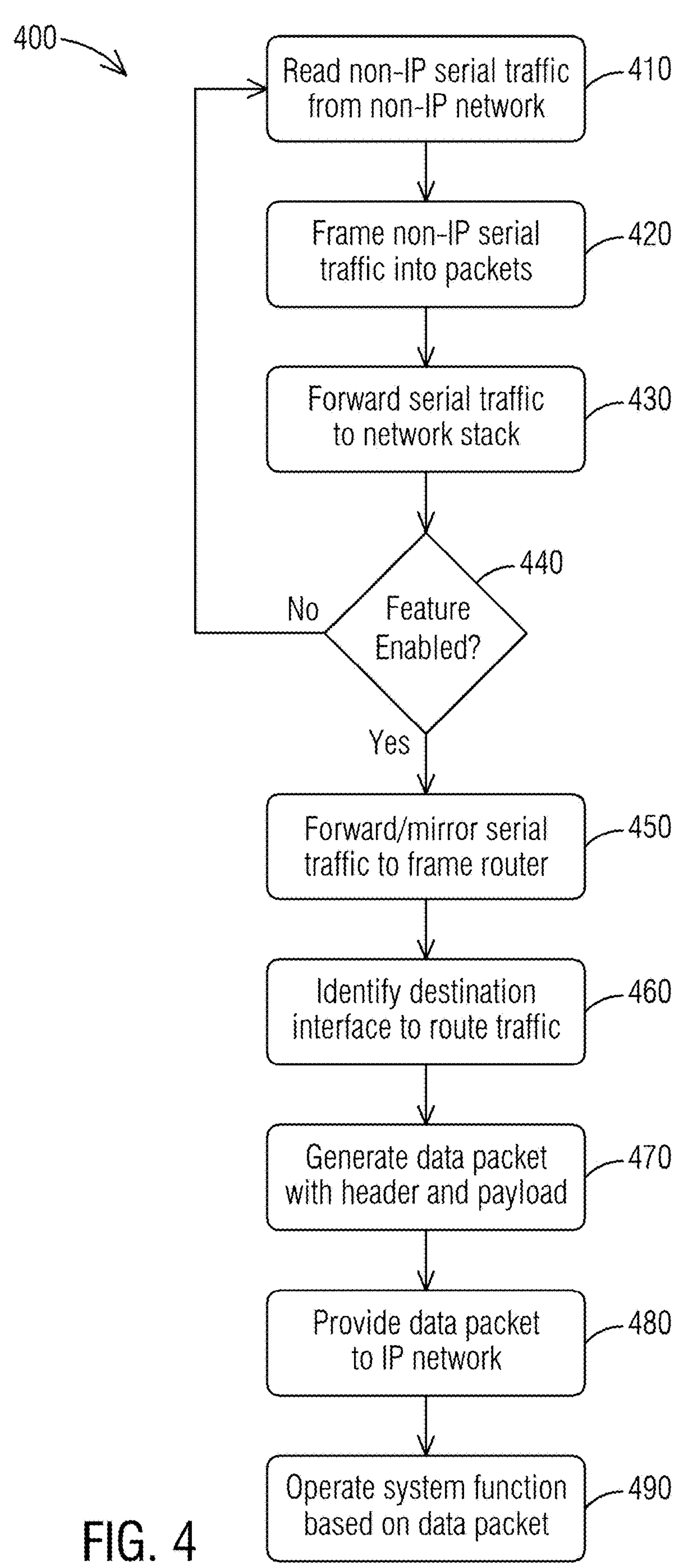
FIG. 4 is a flow diagram of an operation of the building controller of FIGS. 1 and 2 in an example implementation that is operable to employ the techniques described herein.

Referring to FIG. 4, there is shown an operation 400 of the building controller in an example implementation that is operable to employ the techniques described herein. The operation 400 is a method of a building controller 230 for routing serial traffic to a remote device 222 of a building management system 100. The first interface 234 of the building controller 230 reads (410) non-IP serial traffic from a non-IP network 250 of building devices 240 managed by the building controller 230. For example, the first interface 234 may read the non-IP traffic data by receiving the non-IP traffic data from an MSTP port or other serial traffic port connected to the non-IP network. In response to reading (410) the non-IP serial traffic, the first interface 234 of the building controller 230 forwards (430) the non-IP serial traffic to a building network stack 238 operating on the building controller. For some embodiments, the first interface 234, such as a MSTP datalink layer, frames (420) the non-IP serial traffic data into serial traffic packets, and the first interface forwards (430) the non-IP serial traffic of the building network stack 238 in response to framing the serial traffic data.

The building network stack 238 of the building controller 230 facilitates communications among components of the building controller 238. The building controller 230 performs building controller operations based on data store at the building network stack 238, i.e., the main application of the building controller 230 for normal processing of controller functions. In this manner, the building controller 238 performs building controller operations based on data stored at the building network stack 238. The building network stack 238 provides the non-IP serial traffic to one or more controller components 260 and allows the non-IP serial traffic, or a duplicate thereof, to be provided to the frame router 232 as well.

In addition to providing the non-IP serial traffic to the controller component(s) 260, the building network stack 238 forwards (450) the non-IP serial traffic, or a duplicate thereof, to the frame router 232 operating on the building controller in response to detecting (440) that remote traffic monitoring has been enabled. For some embodiments, the frame router 232 of the building controller 230 detects enablement of the remote traffic monitoring by receiving a signal from the user interface 328 of the building controller.

In response to receiving (450) the non-IP serial traffic, the frame router 232 identifies (460) a destination interface of the building controller to route the non-IP serial traffic. For some embodiments, the frame router 232 identifies the destination interface by determining the destination to route the non-IP serial traffic based on a source traffic type, a source interface, and/or a destination configuration. Also, in response to receiving (450) the non-IP serial traffic or, in the alternative, identifying the destination interface, the frame router 232 generates (470) a data packet that includes the non-IP serial traffic and an IP header. For some embodiments, the IP header includes a timestamp, a number of data units in the data packet, and/or a length of the data packet.

In response to generating (470) the data packet, the frame router 232 forwards the data packet to the second interface 236, and the second interface 236 provides the data packet to an IP network 210 of building management devices 220 connected to the building controller 230. The building management devices 220 including the remote device 222 of the building management system 100 connected to the IP network 210. For some embodiments, the providing (480) the data packet includes sending a global header including a protocol type of the IP header of the data packet to the IP network 210. For some embodiments, providing (480) the data packet includes sending the data packet by a TCP server running in the building controller 230 to an IP network destination. For some embodiments, sending the data packet includes identifying a TCP port of the building controller 230 corresponding to the IP network destination based on a configuration of the serial traffic analyzer operating at the remote device 222.

The remote device 222 has a serial traffic analyzer operating at the remote device 222 to analyze the non-IP serial traffic, and the remote device 222 performs (490) other functions as a result of this analysis. For some embodiments, the remote device 222 may output analysis results at an output component of the I/O interfaces 320 or forward the analysis results to another management device 220 via wired or wireless link. For example, a notification may be sent to a system operator or owner to report the status or performance of building devices 250 or the system 100 as a whole. For some embodiments, the remote device 222 may send a command to back to one or more building devices 240 via the building controller 230 to modify a device operation. For example, the remote device 222 may detect a fault and the command may instruct a building device 240 to perform diagnostics or correction of a device function. For some embodiments, the remote device 222 may command one or more management devices 220 to generate a work order to modify a device operation of a building device 240.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution.

Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

The invention claimed is:

1. A building controller for routing serial traffic to a remote device of a building management system, the building controller comprises:

a first interface configured to read non-IP serial traffic to one or more controller components of the building controller from a non-IP network of building devices managed by the building controller, the first interface comprising an MSTP datalink that frames the non-IP serial traffic into serial traffic packets;

a building network stack operating on the building controller to forward the non-IP serial traffic, the building controller performing building controller operations based on data stored at the building network stack;

a frame router operating on the building controller to receive the non-IP serial traffic in response to detecting that remote traffic monitoring has been enabled, identify a destination interface of the building controller to route the non-IP serial traffic, and generate a data packet that includes the non-IP serial traffic and an IP header; and a second interface configured to provide the data packet to an IP network of building management devices connected to the building controller by a TCP server running in the building controller that sends the data packet to the remote device via the IP network, wherein the TCP server identifies a TCP port of the building controller corresponding to a destination on the IP network based on a configuration of the serial traffic analyzer operating at the remote device, the building management devices including the remote device of the building management system connected to the IP network, the remote device having a serial traffic analyzer operating at the remote device.

2. The building controller as described in claim 1, wherein the first interface is an MSTP port connected to the non-IP network that receives the non-IP traffic data.

3. The building controller as described in claim 1, further comprising a MSTP datalink layer that frames the non-IP traffic data into serial traffic packets.

4. The building controller as described in claim 1, wherein the frame router detects enablement of the remote traffic monitoring by receiving a signal from a user interface of the building controller.

5. The building controller as described in claim 1, wherein the frame router identifies the destination interface by determining the destination to route the non-IP serial traffic based on a source traffic type, a source interface, and a destination configuration.

6. The building controller as described in claim 1, wherein the IP header includes a timestamp, a number of data units in the data packet, and a length of the data packet.

7. The building controller as described in claim 1, wherein the second interface provides the data packet by sending a global header including a protocol type of the IP header of the data packet to the IP network.

8. The building controller as described in claim 1, wherein the second interface provides the data packet by sending the data packet by a TCP server running in the building controller to an IP network destination.

9. The building controller as described in claim 8, wherein the second interface sends the data packet by identifying a TCP port of the building controller corresponding to the IP network destination based on a configuration of the serial traffic analyzer operating at the remote device.

10. A method of a building controller for routing serial traffic to a remote device of a building management system, the method comprising:

reading non-IP serial traffic from a non-IP network of building devices managed by the building controller;

framing, by an MSTP datalink layer of the building controller, the non-IP serial traffic into serial traffic packets;

forwarding the non-IP serial traffic to a building network stack operating on the building controller, wherein the building controller performs building controller operations based on data stored at the building network stack, and wherein the building network stack provides the non-IP serial traffic to one or more controller components of the building controller for performing the building controller operations;

forwarding the non-IP serial traffic, or a duplicate thereof, from the building network stack to a frame router operating on the building controller in response to detecting that remote traffic monitoring has been enabled;

identifying, by the frame router, a destination interface of the building controller to route the non-IP serial traffic;

generating, by the frame router, a data packet that includes the non-IP serial traffic and an IP header; and providing the data packet by a TCP server running in the building controller to an IP network of building management devices connected to the building controller, wherein the TCP server identifies a TCP port of the building controller corresponding to a destination on the IP network based on a configuration of the serial traffic analyzer operating at the remote device, the building management devices including the remote device of the building management system connected to the IP network, the remote device having a serial traffic analyzer operating at the remote device.

11. The method as described in claim 10, wherein reading the non-IP traffic data includes receiving the non-IP traffic data from an MSTP port connected to the non-IP network.

12. The method as described in claim 10, further comprising framing the non-IP serial traffic data by a MSTP datalink layer into serial traffic packets.

13. The method as described in claim 10, wherein detecting enablement of the remote traffic monitoring includes receiving a signal from a user interface of the building controller.

14. The method as described in claim 10, wherein identifying the destination interface includes determining the destination to route the non-IP serial traffic based on a source traffic type, a source interface, and a destination configuration.

15. The method as described in claim 10, wherein the IP header includes a timestamp, a number of data units in the data packet, and a length of the data packet.

16. The method as described in claim 10, wherein providing the data packet includes sending a global header including a protocol type of the IP header of the data packet to the IP network.

17. The method as described in claim 10, wherein providing the data packet includes sending the data packet by a TCP server running in the building controller to an IP network destination.

18. The method as described in claim 17, wherein sending the data packet includes identifying a TCP port of the building controller corresponding to the IP network destination based on a configuration of the serial traffic analyzer operating at the remote device.

* * * * *